US012439272B2

(12) United States Patent
Swartz et al.

(10) Patent No.: US 12,439,272 B2
(45) Date of Patent: Oct. 7, 2025

(54) DYNAMIC WIRELESS LOCAL AREA NETWORK CONFIGURATION IN LARGE PUBLIC VENUE ENVIRONMENTS

(71) Applicant: Cisco Technology, Inc., San Jose, CA (US)

(72) Inventors: John Matthew Swartz, Lithia, FL (US); Jerome Henry, Pittsboro, NC (US); Robert Edgar Barton, Richmond (CA); Matthew Aaron Silverman, Shaker Heights, OH (US); Fred Jay Anderson, Lakeville, OH (US); Joshua D. Suhr, Lenexa, KS (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 526 days.

(21) Appl. No.: 17/982,824

(22) Filed: Nov. 8, 2022

(65) Prior Publication Data

US 2024/0155368 A1 May 9, 2024

(51) Int. Cl.
*H04W 16/20* (2009.01)
*H04W 4/021* (2018.01)
(Continued)

(52) U.S. Cl.
CPC ........... *H04W 16/20* (2013.01); *H04W 4/021* (2013.01); *H04W 24/02* (2013.01); *H04W 84/12* (2013.01)

(58) Field of Classification Search
CPC ..... H04W 16/20; H04W 4/021; H04W 24/02; H04W 84/12; H04W 72/23;
(Continued)

(56) References Cited

U.S. PATENT DOCUMENTS

2011/0103229 A1 5/2011 Fidler
2015/0120930 A1 4/2015 Kamthe
(Continued)

OTHER PUBLICATIONS

Oliveira, L. et al., "IEEE Access, Mobile Device Detection Through WiFi Probe Request Analysis," Special Section on Data Mining for Internet of Things, https://ieeexplore.ieee.org/document/8747391, Jun. 2019, 10 pages.

(Continued)

*Primary Examiner* — Diane D Mizrahi
*Assistant Examiner* — Jing Gao
(74) *Attorney, Agent, or Firm* — Edell, Shapiro & Finnan, LLC

(57) ABSTRACT

Techniques herein facilitate dynamic configuration of a wireless local area network (WLAN) for large public venue (LPV) environments. In one example, a method may include providing an initial configuration for access points APs of a WLAN for an event at an LPV based on a profile for the event, a location of each AP for the venue, and anticipated demand at the APs; determining, for a particular time for the event, a distribution of wireless devices and channel support capabilities of the wireless devices different locations for the LPV; and providing an updated configuration for one or more APs at the one or more locations for the venue based on the distribution of the wireless devices and the channel support capabilities of the wireless devices determined for the particular time for the event at the LPV.

20 Claims, 6 Drawing Sheets

(51) Int. Cl.
*H04W 24/02* (2009.01)
*H04W 84/12* (2009.01)

(58) Field of Classification Search
CPC . H04W 72/0446; H04W 88/08; H04W 88/02;
H04W 4/029; H04W 4/02; H04W 64/00;
H04W 4/023; H04W 72/56; H04W
84/045; H04W 60/04; H04W 72/51;
H04W 24/04; H04W 64/003; H04W 4/08;
H04W 76/38; H04W 48/04; H04W 4/33;
H04W 12/63; H04W 48/14; H04W 72/52;
H04W 36/322; H04W 72/54; H04W
72/569; H04W 72/121; H04W 28/0226;
H04W 28/0215; H04W 16/08; H04W
40/14
See application file for complete search history.

(56) References Cited

U.S. PATENT DOCUMENTS

2017/0265104 A1    9/2017    Arslan et al.
2017/0338883 A1*  11/2017    Clarke .................. H04W 24/02
2022/0109614 A1    4/2022    Mo
2022/0225115 A1    7/2022    Kalavakuru et al.
2023/0309166 A1*   9/2023    Qiao ..................... H04W 76/12

OTHER PUBLICATIONS

Cisco Public, White Paper, "Wi-Fi 6E: The Next Great Chapter in Wi-Fi," https://www.cisco.com/c/en/us/solutions/collateral/enterprise-networks/802-11ax-solution/nb-06-wi-fi-6e-wp-cte-en.html, retrieved Nov. 4, 2022, 10 pages.
Cisco, "Meraki", Reference Article, https://documentation.meraki.com/MR/Wi-Fi_Basics_and_Best_Practices/Channel_Planning_Best_Practices, retrieved Nov. 4, 2022, 6 pages.
Swartz, M, Cisco Blogs, Networking, "Wi-Fi 6E: Changing the game for Sports and Entertainment venues," https://blogs.cisco.com/networking/wi-fi-6e-changing-the-game-for-sports-and-entertainment-venues, Dec. 16, 2021, 5 pages.

* cited by examiner

DYNAMIC WIRELESS LOCAL AREA NETWORK CONFIGURATION IN LARGE PUBLIC VENUE ENVIRONMENTS

TECHNICAL FIELD

The present disclosure relates to wireless communication.

BACKGROUND

In large public venue (LPV) wireless local area network (WLAN) environments, there can be large changes in the number and distribution of people attending an event at a given venue. As most people that attend an event at an LPV are often carrying a wireless device, it can be challenging to configure a wireless network for an LPV in a manner that provides a simplified and quality user experience for people attending an LPV event throughout an entirety of the event.

DETAILED DESCRIPTION

Overview

Embodiments disclosed herein may facilitate a simplified user experience for a wireless local area network (WLAN) implemented within a large public venue (LPV) environment by providing for the ability to dynamically control the network configuration of wireless access points (AP) for the WLAN in a manner that supports changes in the environment throughout one or more events for the LPV.

In one embodiment, a method is provided that may include providing an initial configuration for a plurality of access points of a wireless network for an event at a venue, wherein the initial configuration is based on a profile for the event, a location of each access point of the plurality of access points of the wireless network for a plurality of locations for the venue, and anticipated demand at the plurality of access points of the wireless network for the venue; determining, for a particular time for the event at the venue, a distribution of wireless devices and channel support capabilities of the wireless devices at one or more locations of the plurality of locations for the venue; and providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue.

Example Embodiments

Figure 1A:
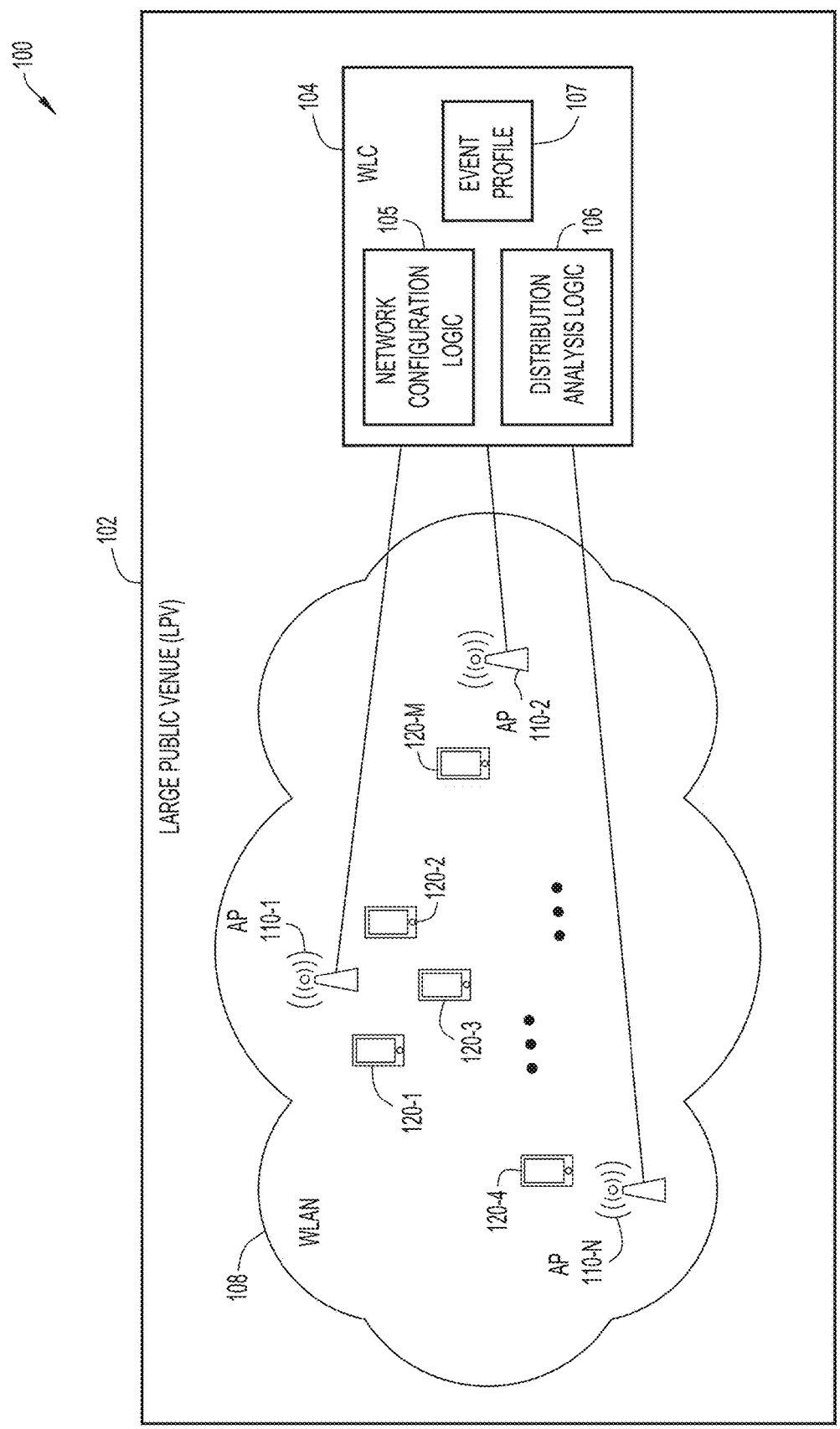
FIG. 1A is a block diagram of a system that may facilitate dynamic wireless local area network (WLAN) configuration in a large public venue (LPV) environment, according to an example embodiment.

With reference to FIG. 1A, FIG. 1A is a block diagram of a system 100 that may facilitate dynamic wireless local area network (WLAN) configuration in a large public venue (LPV) environment, according to an example embodiment. As illustrated in FIG. 1A, system 100 may include a large public venue (LPV) 102 that may include a wireless local area network (LAN) controller (WLC) 104 and a wireless local area network (WLAN) 108 that includes a number of wireless access points (APs), shown in FIG. 1A as AP 110-1, AP 110-2, thru AP 110-N. Also shown in FIG. 1A are a number of wireless devices including wireless device 120-1, 120-2, 120-3, 120-4, thru 120-M. It is to be understood that the number of wireless APs and wireless devices shown in FIG. 1A is provided for illustrative purposes only and is not meant to limit the broad scope of the present disclosure; any number of wireless APs may be configured for WLAN 108 and any number of wireless devices may be present within the WLAN 108/LPV 102.

In the ensuing description, a wireless device may be referred to interchangeably as a 'client device', 'wireless client', 'wireless STA', 'wireless client STA', and 'wireless client device', 'a client device configured to communicate wirelessly', and variations thereof. Further, a wireless AP may be referred to interchangeably as an 'AP', a 'wireless radio', a 'radio', a 'radio node', and variations thereof.

Figure 1B:
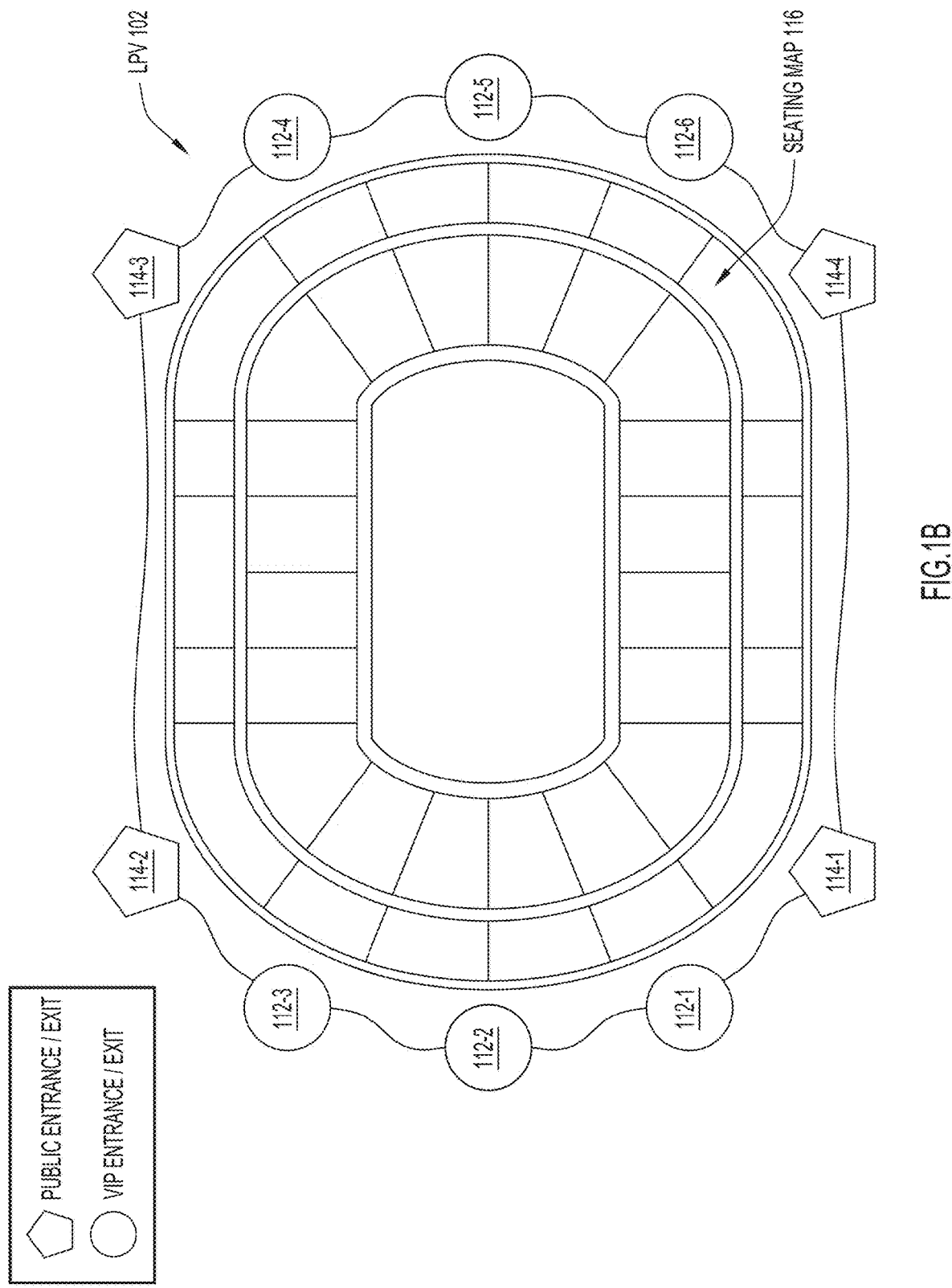
FIG. 1B is a diagram illustrating example details that may be associated with the LPV of FIG. 1A.

FIG. 1B is a diagram illustrating example details of the LPV 102 of FIG. 1A and will be discussed with reference to FIG. 1A. For example, LPV 102 may include a number of public entrances/exits, labeled 112-1, 112-2, 112-3, 112-4, 112-5, and 112-6 in FIG. 1B, and a number of "very important person" (VIP) entrances/exits, labeled 114-1, 114-2, 114-3, and 114-4 in FIG. 1B. Also shown in FIG. 1B is a seating map 116 illustrating example seating locations for LPV 102. Although LPV 102 is generally illustrated in FIG. 1B as being an arena or stadium, it is to be understood that an LPV may be any enclosed or open arena, stadium, music venue, amusement park, building, etc., that may be utilized for one or more events/event types (e.g., a sports event, a music event, a conference, etc.).

As illustrated in FIG. 1A, WLC 104 may be configured with network configuration logic 105, distribution analysis logic 106, and one or more event profiles 107, as discussed in further detail herein, below. WLC 104 communicates with and controls the APs 110-1-110-N, which serve WLAN 108 within which wireless devices 120-1-120-M can wireless connect to and be served by one or more of the APs 110-1-110-N throughout an event provided via the LPV 102. WLC 104 may also serve as a bridge to transport traffic for wireless devices 120-1-120-M communicated between WLAN 108 (e.g., APs 110-1-110-N) and one or more data networks (not shown), which may include one or more wide area networks (WANs), such as the Internet, and/or one or more LANs (e.g., a local network provided by LPV 102).

Generally, WLC 104 and APs 110-1-110-N and be referred to herein as a 'wireless infrastructure' or 'wireless network infrastructure'. APs 110-1-110-N provide wireless connectivity, such as Institute of Electrical and Electronics Engineers (IEEE) 802.11 wireless connectivity (and variants thereof) for wireless devices 120-1-120-M to access one or more networks via WLC 104.

During operation, wireless devices 120-1-120-M can perform 802.11 association and authentication to wirelessly attach/connect to WLAN 108, which is under control and configuration of WLC 104 in order for the wireless devices 120-1-120-M to establish communication sessions within system 100. Once authenticated, wireless devices 120-1-120-M may exchange packets with one or more networks through one or more of APs 110-1-110-N and WLC 104 during the communication sessions.

Wireless devices 120-1-120-M may be associated with any person, user, subscriber, employee, client, customer, and/or the like and may be inclusive of any device that initiates a communication in the system, such as a computer, a laptop or electronic notebook, a cellular/Wi-Fi enabled telephone/smart phone, tablet, etc. and/or any other device, component, element, or object capable of initiating voice, audio, video, media, or data exchanges within system 100 (e.g., any Internet of Things (IoT) device or machine that may be used in an LPV environment, such as a ticket scanner, a vending machine, a parking meter, wireless camera, motion detector, etc.). Wireless devices discussed herein may include corresponding communication input/output (I/O) interface(s) each of which may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, etc.), software, logic, and/or any other elements/logic that may facilitate wireless and/or wired communications and/or connections among one or more elements of system 100.

In LPV environments, such as those illustrated for LPV 102, there can be drastic differences between various events held at the LPV 102. Even throughout an event at the LPV 102, network demands between the beginning, middle and end of an event can be drastically different (e.g., network demands during a sporting event half time show versus during the game versus the end of the game.

These differences can manifest in many disparate areas of network management and control of WLAN 108, such as rate limiting/management, managing uplink versus downlink bandwidth needs, managing Radio Frequency (RF) coverage of APs (e.g., APs 110-1-110-N), managing channelization, managing which channels will be supported/usable by different APs for different populations and/or distributions of wireless devices (e.g., wireless devices 120-1-120-3), managing what control features will be supported by different APs for different populations and/or distributions of wireless devices, and/or the like in which such management and control of WLAN 108/APs 110-1-110-N may be adjusted throughout different times of an event and/or AP locations within LPV 102 in accordance with various embodiments herein.

For example, in one instance for indoor deployments of a WLAN under Low-Power Indoor (LPI) deployment guidelines, 6 Gigahertz (GHz) channels are governed by strict Power Spectral Density (PSD) regulations that limit the radiated power (and to a great degree, cell size) in accordance with channel bandwidth. In another example, LPV environments may favor a multiplicity of narrow channels (for channel reuse reasons) but as a channel narrows, an AP's Effective Isotropic Radiated Power (EIRP) can be more restricted, reducing wireless device measured Received Signal Strength Indication (RSSI), which can affect the cell size/coverage area over which wireless devices may attach to a given AP.

Further, changing occupancy and/or distribution of occupancy of wireless devices 120-1-120-M at various locations of LPV 102 throughout a given event and/or across different event types can impact management and control of WLAN 108 by WLC 104. For example, at the beginning of an event, management and control of APs located near entrances/exits (e.g., any of public entrances exits 112-1-112-6 and/or 114-1-114-4) may be utilized to ensure sufficient network resources are provided to event attendees entering/exiting LPV 102 in accordance with various embodiments herein.

Further, many stadiums/LPVs have under-seat AP deployments. Part of operating such an under-seat AP deployment properly relies on people being in seats in order to block RF signals from propagating far enough to interfere with other APs and/or co-channel Basic Service Set (BSS) interference. Prior to an event at LPV 102, there may be very few people in their seats such that the lack of bodies can leads to a lack of RF attenuation, which can create co-channel interference for people/wireless devices in press-boxes or on staff networks. Thus, throughout an event at LPV 102 (e.g., prior to an event, at the beginning of the event, throughout the event, and at the end of the event), management and control of APs located throughout seating of LPV 102 (e.g., as can be tied to/correlated with seating map 116) may be provided by WLC 104 in accordance with various embodiments herein in order to ensure sufficient/appropriate WLAN 108 resources are provided for various wireless devices throughout the event.

Further, management and control of channel support and/or control features provided/supported by WLAN 108 may be provided by WLC 104 in accordance with embodiments herein in order to ensure sufficient/appropriate WLAN 108 resources are provided for various wireless devices 120-1-120-M throughout an event at LPV 102. Many wireless devices may not support all 5 GHz channels. For example, Unlicensed National Information Infrastructure (U-NII) types II (U-NII-II) and IIe (U-NII-IIe) are bands of channels that are typically unsupported by wireless devices. Such devices that do not support U-NII-II/IIe bands may include ticket scanners and/or other IoT devices. Further, many wireless devices do not support 6 GHz channels.

Still further, management and control of optional control features provided/supported by WLAN 108 may be provided by WLC 104 in accordance with embodiments herein in order to ensure sufficient/appropriate WLAN 108 resources are provided for various wireless devices 120-1-120-M throughout an event at LPV 102. For example, different wireless devices 120-1-120-M present for a given event at LPV 102 may support or not support different optional control features that may be available within different IEEE 802.11 standards, such as for Wi-Fi 5 (IEEE 802.11ac) versus Wi-Fi 6/6E (IEEE 802.11ax) versus Wi-Fi 7 (IEEE 802.11be) versus any other IEEE 802.11 variants. In another example, different wireless devices 120-1-120-M present for a given event at LPV 102 may support or not support different optional control features such as Target Wake Time (TWT) and/or restricted TWT (rTWT) features (which can facilitate deterministic scheduling for wireless devices), Multi-Link Operation (MLO) features (e.g., supporting connection to different combinations of 2.5 GHz, 5 GHz, and/or 6 GHz bands/channels), Dynamic Frequency Selection features (as provided by IEEE 802.11h). In some instances, different firmware versions, different Operating System (OS) types/versions, and/or different applications operating/executing for wireless devices 120-1-120-M may indicate which channels and/or control features may or may not be supported by different devices.

In accordance with embodiments WLC 104 may advantageously provide for the management and control of WLAN 108 functionality throughout one or more events/event types at LPV 102 by being cognizant of different network effects that may be caused through the assignment of channels (e.g., channel numbers, channel bandwidths, etc.) to be supported by different APs considering reuse and cell size based on the distribution of wireless device and supported capabilities of wireless devices determined throughout a given event/event type at LPV 102.

Broadly during operation of system 100, embodiments herein facilitate an ongoing discovery process through which WLC 104, via one or more event profiles 107 and distribution analysis logic 106, can determine different distributions of wireless devices 120-1-120-M among different locations of LPV 102, as well as different capabilities supported by such wireless devices 120-1-120-M for an event at LPV 102, which can be determined in aggregate across multiple events of different or the same event type and/or as determined based on use case/event/event type and/or location within the LPV 102. Such ongoing discovery, can be used to facilitate dynamic updates to network configurations of WLAN 108 by WLC 104 via network configuration logic 105, such as to assign/update different channels that are to be supported by different APs 110-1-110-N, to assign/update bandwidth configurations that are to be supported by APs 110-1-110-N, to assign/update rate limiting/management configurations, to optimize control features/operations supported by APs 110-1-110-N based on wireless device 120-1-120-M capabilities, combinations thereof, and/or the like.

Figure 2:
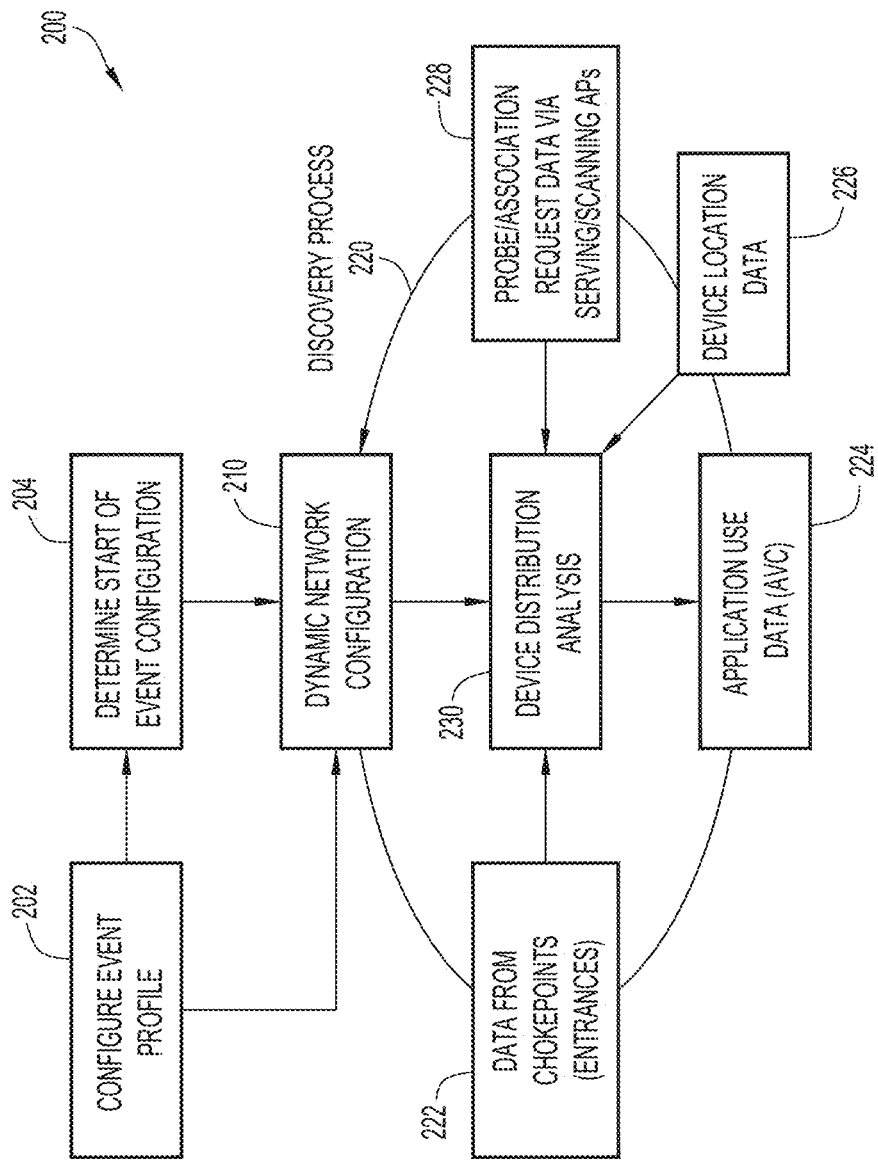
FIG. 2 is a block diagram illustrating various operations that may be performed in order to in order to facilitate dynamic WLAN configuration for an LPV, according to an example embodiment.

Consider an operational example for the LPV 102 of FIGS. 1A and 1B discussed with reference to FIG. 2, which is a block diagram illustrating various operations 200 that may be performed in order to in order to facilitate dynamic WLAN 108 configuration for LPV 102 by WLC 104, according to an example embodiment.

For example, operations 200 may include, as shown at 202, configuring an event profile, such as event profile 107, for WLC 104 for an event to be provided at LPV 102. In some embodiments, the event profile 107 can be manually configured for WLC 104 by an administrator, however, in other embodiments the event profile 107 can be obtained by WLC 104 from a policy server (not shown) or the like, such as a cloud service that may manage events for one or more LPVs.

Various information can be configured for the event profile 107 that can help to drive the network configuration of WLAN 108, such as an event type (e.g., music/theater event, sporting event, conference, etc.), milestones and/or other temporal information for an event/event type in which mass migration of attendees tends to occur (e.g., start time of event, end time of event, intermediate times for the event, such as intermission, halftime, $7^{th}$ inning stretch, end of opening act, etc.), mapping/location/geographical information associated with LPV 102 (e.g., entrance/exit locations including types (public/VIP), which ones may/may not be used for certain events/event types and/or may be used for only one of entrance or exit), seating maps (including which seats may/may not be used for an event/event type and a number of tickets sold for an event, which can be used to determine anticipated demand at different locations throughout LPV 102), seat levels (e.g., general admission, VIP, etc.), suite maps (and expected occupancy, which can also be used to determine anticipated demand for an event), LPV 102 layout information (e.g., walkways, food locations, bathrooms, etc.), AP 110-1-110-N locations relative to mapping/location/geographical information associated with LPV 102, combinations thereof, and/or the like. In some embodiments, the event profile 107 may also include information indicating wireless device types/capabilities thereof that may be expected for a given event based on the event type (e.g., certain wireless devices/capabilities thereof may be expected for a theater performance while other wireless devices may be expected for a horse race) that can indicate anticipated demand for the event. The event profile 107 can be relevant/utilized by WLC 104/logic configured therefor throughout an event.

Based on the event profile 107 and the anticipated demand determined for the event, WLC 104, via network configuration logic 105, determines a configuration for WLAN 108 for the start of the event, as shown at 204, and configures the WLAN 108, as shown at 210, in order to provide an initial configuration for the APs 110-1-110-N. In at least one embodiment, providing the initial configuration for the APs 110-1-110-N can include configuring at least one of channels (e.g., channel numbers, channel bandwidths, etc.) and/or control features to be provided by the APs 110-1-110-N for the various locations of LPV 102. In some embodiments, providing the initial configuration may include configuring APs that are located at the entrances (e.g., 112/114) to enable a scanning mode such that radios for the APs can actively seek out/collect capability sets of wireless devices 120-1-120-M as they enter LPV 102, as discussed in further detail below.

Following the initial configuration for WLAN 108/APs 110-1-110-N, an ongoing discovery process can be performed, as illustrated at 220, through which wireless device data and/or WLAN 108 data can be collected throughout the event by WLC 104/distribution analysis logic 106 in order to perform device distribution analysis, as shown at 230, based on the collected data in order to dynamically determine whether any updates for the configuration of WLAN 108 may be provided.

For example, as illustrated at 222 data from chokepoints, such as from APs located at entrances 112-1-112-6 and/or 114-1-114-4 can be obtained by WLC 106/distribution analysis logic 106 at the start of an event or during a pre-event time period (e.g., prior to a schedule first act, start of a game, etc.) as people are arriving at LPV 102. Entrances 112-1-112-6 and/or 114-1-114-4 can be natural chokepoints at which to collect data for wireless devices 120-1-120-M in order to determine channel support capabilities, supported control feature capabilities, and/or the like.

APs located at the entrances can have the scanning mode enabled, as discussed above, such that their scanning radios can actively seek out/collect the capabilities sets of the incoming wireless devices 120-1-120-M in at least one embodiment. For example, in one embodiment, as people enter LPV 102, the scanning radios can determine supported channel lists for wireless devices 120-1-120-M by capturing vendor tags/information contained in probe requests received from wireless devices 120-1-120-M and sending the vendor tags/information to a device profiling/characterization engine/node/logic (not shown) that can be configured for the wireless network infrastructure of LPV 102, such as an Application Visibility and Control (AVC) engine/node/logic, through which an estimate of supported channels/control features/etc. of wireless devices 120-1-120-M can be determined based on vendor and OS information for the devices, as shown at 224. Generally, an AVC engine/node/logic provides for the ability to determine/provide a live inventory of device firmware, behavior, supported channels/capabilities, etc. in which such elements of wireless devices as indicated by the AVC engine/node/logic can provide insight that can be used to dynamically configure WLAN 108.

The estimates of the supported features/channels for wireless devices 120-1-120-M can be sent to WLC 104/distribution analysis logic 106 in which the distribution analysis logic 106 can analyze the distribution of supported channels/control features across the incoming wireless devices 120-1-120-M per chokepoint/entrance in order to identify WLAN/AP configurations that may not be optimized for the incoming devices in order to trigger dynamic updates to the configuration of the WLAN/APs, as shown at 210, via WLC 104/network configuration logic 105 in which the updates may include configuring at least one of channels and/or features to be provided by the APs.

For example, if it is determined that APs located at entrance 112-3 are configured to support Wi-Fi 6 control features and certain channels (numbers/bandwidths) but the majority of wireless devices entering LPV 102 at entrance 112-3 are determined (e.g., based on vendor information, probe requests, etc.) to support Wi-Fi 5 control features and other channels not configured at/near entrance 112-3, the configuration of APs at/near entrance 112-3 can be updated to support/provide Wi-Fi 5 control features, along with the corresponding channel numbers/bandwidths in an optimized manner such that AP resources are configured to provide features/channels that are supported by the wireless devices entering/near entrance 112-3. Other WLAN/AP configuration updates can be envisioned. For example, in some instances, one or more of wireless devices 120-1-120-M may be configured with an application that supports sharing ticket information with the network such that the network can determine the most likely path that the user will take from a given chokepoint/entrance to their seat. This information can be used to adjust network settings in AP(s) located along such walkways for pre-event migrations.

The discovery process 220 can be continued throughout the event for LPV 102 such that data from service and scanning radios on APs 110-1-110-N (e.g., providing coverage for seating within LPV) can be provided to WLC 104/device distribution analysis logic 106 through probe requests and/or association requests that may be received by service and scanning radios for the APs 110-1-110-N, as shown at 228.

Figure 3:
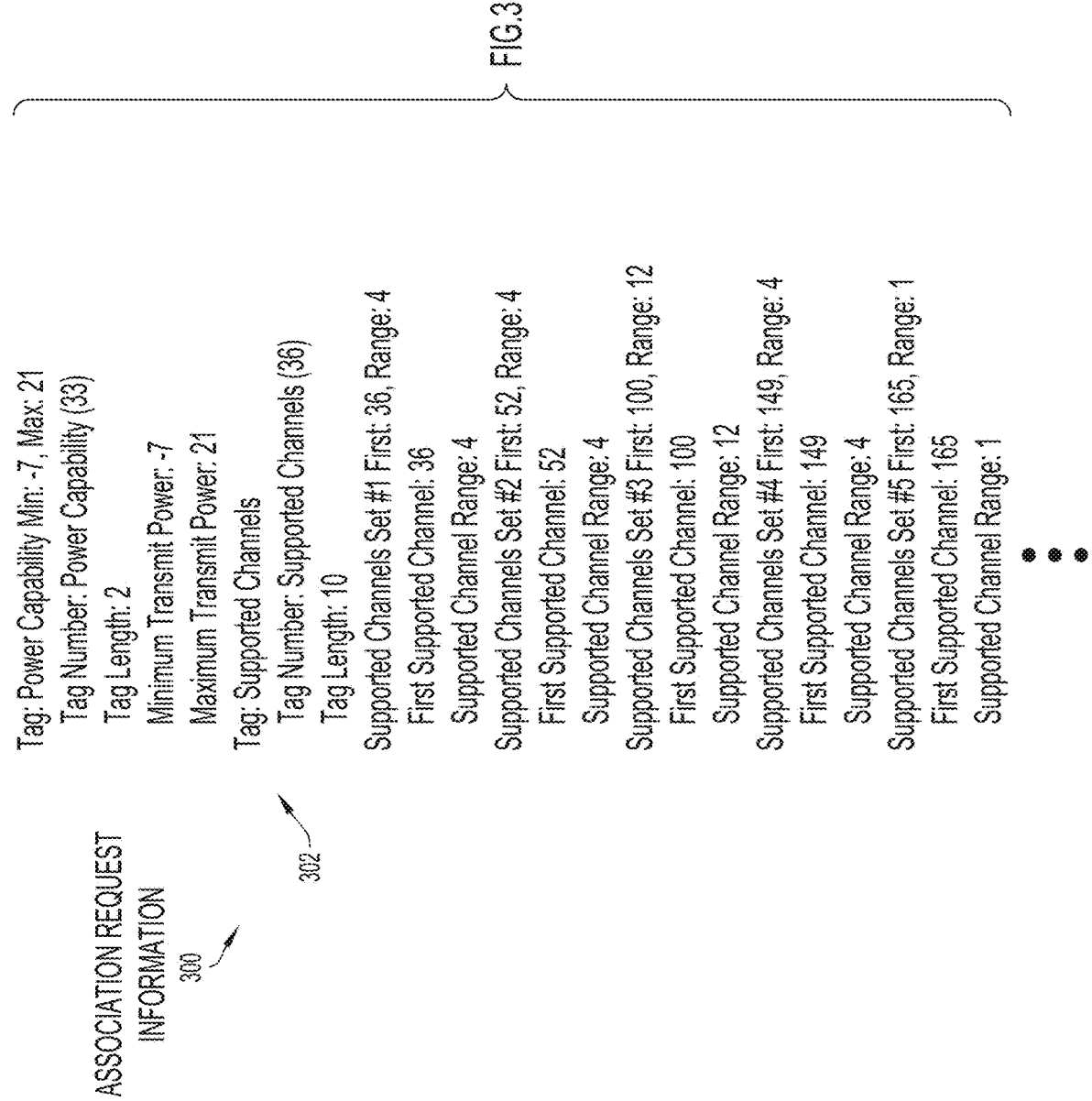
FIG. 3 is a schematic diagram illustrating example supported channel information that can be obtained from a wireless device, according to an example embodiment.

For example, FIG. 3 illustrates example association request information 300 that may be received from a wireless device via an association request. As illustrated in FIG. 3 at 302, an association request can identify channels that are supported by a given wireless device.

Additionally, in some embodiments device location data can be provided to WLC 104/device distribution analysis logic 106 throughout an event, as shown at 226, which may be obtained from a device location server (not shown) configured for the wireless network infrastructure of LPV 120.

In still some embodiments, vendor tag information can be shared with an AVC engine/node/logic by APs gathering such information, through which an estimate of supported channels/control features/etc. of wireless devices 120-1-120-M can be determined based on vendor and OS information for the devices and sent to WLC 104/device distribution analysis logic 106 throughout an event, as shown at 224, in order to determine different distributions of wireless devices, as shown at 230.

Thus, embodiments herein provide that AVC logic and/or any other wireless device characterization system can be utilized to characterize wireless devices 120-1-120-M both entering the LPV 102 and can continue to characterize wireless devices 120-1-120-M throughout an event in order to facilitate updating network configurations of WLAN 108/APs 110-1-110.N in response to different distributions of wireless devices 120-1-120-M at different locations of the LPV 102 throughout an event (e.g., as determined via distribution analysis logic 106/device distribution analysis 230).

If no information is available from the AVC engine/node/logic based on the vendor/OS information, a count of probes can be maintained by WLC 104/device distribution analysis logic 106 throughout an event (e.g., obtained as shown at 228) and can be normalized at 230 to indicate the distribution of probe requests across channels. The distribution of probe requests across the channels can be used to determine a distribution of supported channels for different sections/seating of LPV 102.

Again, based on data obtained by WLC 104/device distribution analysis logic 106 throughout the event, the distribution of supported channels/control features across wireless devices in different sections/seating of LPV 102 can be analyzed at 230 in order to determine whether to trigger dynamic updates for the configuration of the WLAN/APs providing coverage for the different sections/seating, as shown at 210, via WLC 104/network configuration logic 105, in an optimized manner such that AP resources for the different sections/seating are configured to provide features/channels that are supported by the wireless devices located in the different areas of LPV 102.

Further, during key times in the event (e.g., food/bathroom breaks) the network configuration of WLAN 108/APs 110-1-110-N can be adjusted to support migration to the nearest bathrooms, food vendors, etc. in an optimized manner such that AP resources are configured to provide features/channels that are supported by the wireless devices migrating among such locations of LPV 102.

Following the conclusion of and/or near the end of an event for LPV 102 (e.g., determined based on the event profile 107 configured for the event), the network configuration of WLAN 108/APs 110-1-110-N can again be adjusted/updated by WLC 104 in order to support the migration of attendees/wireless devices 120-1-120.M out of LPV. In one embodiment, the configuration of WLAN 108/APs 110-1-110-N can be adjusted/updated to match the network configuration that was established for the start of an event/during a pre-event time period and adjusting for any changes in available routes out of LPV 102 per the event profile 107 (e.g., different exits may be used following an event as compared to entrances used at the beginning of the event).

In some embodiments, machine learning (ML) or artificial intelligence (AI) can be utilized to learn various distribution patterns of a venue among different events of different event types and/or among different events of same event types. Reinforcement learning (RL) can be utilized in which the learning model can be directly trained with the LPV 102 environment. In this embodiment, the RL model can gather contextual-based information (location within the LPV, time, date, day of week, type of event, etc.) along with information that can be gathered by wireless devices and/or APs are devices associate to the WLAN 108 for LPV 102 during events. Such learning can include learning where the chokepoints are (assuming they are unknown prior to an event such that they may be different for different types of events). Considering may people attending events may be repeat attendees (e.g., season ticket holders), once wireless devices for such attendees are associated to WLAN 108, information about the device may be collected and used to train the model, such as the type of device, type of radios supported (e.g., how many wireless devices support Wi-Fi 6E, Wi-Fi 7 MLO, etc.) in which the information could then be used to develop a predictive model to better manage the chokepoints throughout the LPV 102. Such techniques would also have the advantage of not needing to gather information for wireless devices using probe/association requests (e.g., obtained via operations 228) as devices enter the LPV 102.

Figure 4:
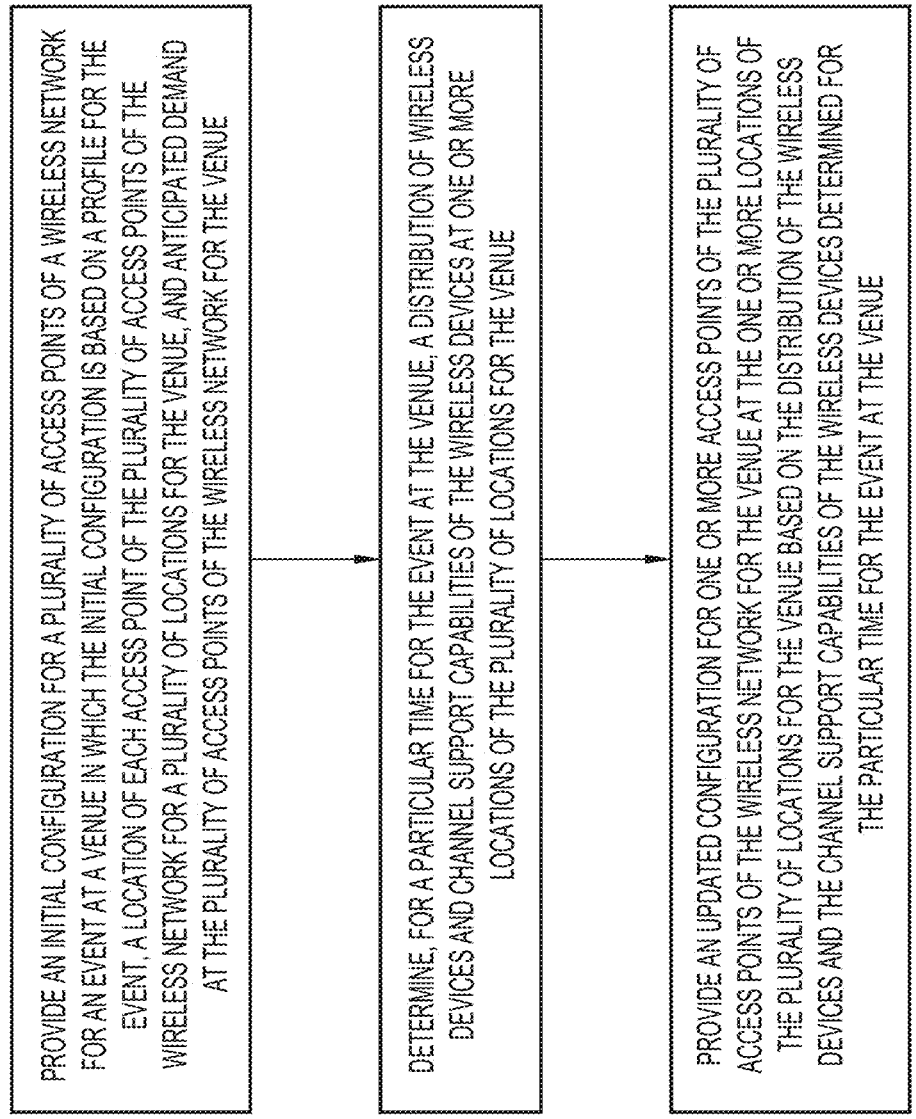
FIG. 4 is a flow chart depicting a method according to an example embodiment.

FIG. 4 is a flow chart depicting a method 400 according to an example embodiment. In at least one embodiment, method 400 may be performed by a WLC of a WLAN infrastructure, such as WLC 104 as illustrated in FIG. 1A.

At 402, the method may include providing an initial configuration for a plurality of access points of a wireless network for an event at a venue (e.g., LPV 102) in which the initial configuration is based on a profile for the event, a location of each access point of the plurality of access points of the wireless network for a plurality of locations for the venue, and anticipated demand at the plurality of access points of the wireless network for the venue.

The profile for the event can identify one or more of a type of the event; location information for the venue identifying at least one of entrance locations for the venue, exit locations for the venue, bathroom locations for the venue, food locations for the venue, walkways for the venue, and seating information for the event; at least one of expected wireless device types or expected wireless device capabilities for the event; or temporal information for the event. Temporal information for the event can include one or more of a start time for the event; an end time for the event; or one or more intermediate times for the event. In some instances, the initial configuration can be further based on at least one of the expected wireless device types or the expected wireless device capabilities for the event. Providing the initial configuration for the plurality of access points of the wireless network for the event at the venue can include configuring at least one of channels or control features that are to be provided by the plurality of access points of the wireless network for the plurality of locations for the venue At 404, the method can include determining, for a particular time for the event at the venue, a distribution of wireless devices and channel support capabilities of the wireless devices at one or more locations of the plurality of locations for the venue. The distribution of the wireless devices and the channel support capabilities of the wireless devices at the one or more locations of the plurality of locations for the venue can be determined based on at least one of probe requests or association requests for the wireless devices. The probe requests or the association requests can identify, at least in part, channels and control features supported by the wireless devices at the one or more locations of the plurality of locations for the venue. In some instances, the channels and control features supported by the wireless devices at the one or more locations of the plurality of locations for the venue can determined based on vendor information for the wireless devices included in the probe requests for the wireless devices.

At 406, the method may include providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue. Providing the updated configuration for the one or more access points of the plurality of access points of the wireless network for the venue at the one or more locations for the venue can include configuring at least one of channels or control features that are to be provided at the one or more access points of the plurality of access points based on the distribution of the wireless devices and the channel support capabilities of the wireless devices determined for the particular time for the event at the venue.

Figure 5:
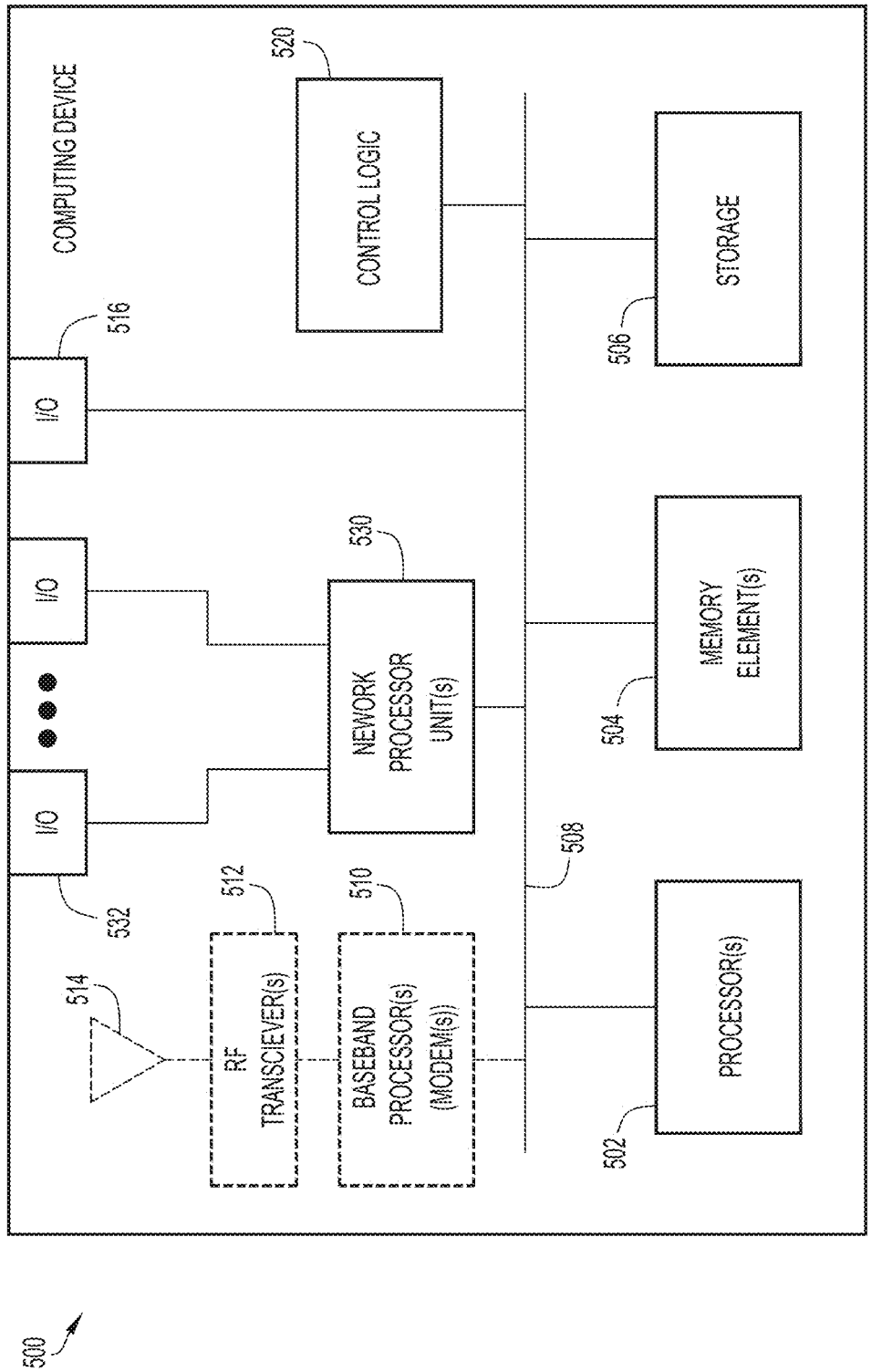
FIG. 5 is a hardware block diagram of a computing device that may perform functions associated with any combination of operations, in connection with techniques discussed for embodiments herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein (e.g., WLC 104 and/or any combination of devices facilitating dynamic WLAN configurations for LPVs) in order to perform operations of the various techniques/embodiments discussed herein.

In at least one embodiment, computing device 500 may be any apparatus that may include one or more processor(s) 502, one or more memory element(s) 504, storage 506, a bus 508, one or more I/O interface(s) 516, control logic 520 (e.g., calendar logic/scheduling logic, as discussed herein), one or more one network processor unit(s) 530 and one or more network I/O interface(s) 532. In various embodiments, instructions associated with logic for computing device 500 can overlap in any manner and are not limited to the specific allocation of instructions and/or operations described herein.

For embodiments in which computing device 500 may be implemented as any device capable of wireless communications, computing device 500 may further include at least one baseband processor or modem 510, one or more radio RF transceiver(s) 512, one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that are configured for computing device 500. In at least one embodiment, bus 508 is implemented as a fast kernel-hosted interconnect, potentially using shared memory between processes (e.g., logic), which can enable efficient communication paths between the processes.

Network processor unit(s) 530 may enable communication between computing device 500 and other systems, devices, or entities, via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 500 and other systems, devices, or entities to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that are connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 500 supports a display having touch-screen display capabilities.

For embodiments in which computing device 500 is implemented as a user device or any other apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 (which can include any combination of network configuration logic 105 and distribution analysis logic 106 for WLC 104) can include instructions that, when executed, cause processor(s) 502 to perform operations, which can include, but not be limited to, providing overall control operations of computing device 500; interacting with other entities, elements, systems, etc. described herein (e.g., for configuring APs 110-1-110-N of WLAN 108); maintaining and/or interacting with stored data, information, parameters, etc. (e.g., memory element(s), storage, data structures, databases, tables, etc., such as data/information obtained/gathered for wireless devices 120-1-120-M); combinations thereof; and/or the like to facilitate various operations for embodiments described herein.

The programs described herein (e.g., control logic 520 of computing device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 504 of computing device 500) and/or storage (e.g., storage 506 of computing device 500) can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include providing an initial configuration for a plurality of access points of a wireless network for an event at a venue, wherein the initial configuration is based on a profile for the event, a location of each access point of the plurality of access points of the wireless network for a plurality of locations for the venue, and anticipated demand at the plurality of access points of the wireless network for the venue; determining, for a particular time for the event at the venue, a distribution of wireless devices and channel support capabilities of the wireless devices at one or more locations of the plurality of locations for the venue; and providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue.

The profile for the event can identify one or more of a type of the event; location information for the venue identifying at least one of entrance locations for the venue, exit locations for the venue, bathroom locations for the venue, food locations for the venue, walkways for the venue, and seating information for the event; at least one of expected wireless device types or expected wireless device capabilities for the event; or temporal information for the event. Temporal information for the event can include one or more of a start time for the event; an end time for the event; or one or more intermediate times for the event. In some instances, the initial configuration can be further based on at least one of the expected wireless device types or the expected wireless device capabilities for the event.

In some instances, providing the initial configuration for the plurality of access points of the wireless network for the event at the venue includes configuring at least one of channels or control features that are to be provided by the plurality of access points of the wireless network for the plurality of locations for the venue. The distribution of the wireless devices and the channel support capabilities of the wireless devices at the one or more locations of the plurality of locations for the venue can be determined based on at least one of probe requests or association requests for the wireless devices. The probe requests or the association requests can identify, at least in part, channels and control features supported by the wireless devices at the one or more locations of the plurality of locations for the venue.

In some instances, the channels and control features supported by the wireless devices at the one or more locations of the plurality of locations for the venue can be determined based on vendor information for the wireless devices included in the probe requests for the wireless devices. In various instances, the control features include one or more of Target Wake Time (TWT); restricted TWT (rTWT); Multi-Link Operation (MLO); spectrum or bandwidth specific features; or Dynamic Frequency Selection (DFS).

Providing the updated configuration for the one or more access points of the plurality of access points of the wireless network for the venue at the one or more locations for the venue can include configuring at least one of channels or control features that are to be provided at the one or more access points of the plurality of access points based on the distribution of the wireless devices and the channel support capabilities of the wireless devices determined for the particular time for the event at the venue.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
providing an initial configuration for a plurality of access points of a wireless network for an event at a venue, wherein the initial configuration is based on a profile for the event, a location of each access point of the plurality of access points of the wireless network for a plurality of locations for the venue, and anticipated demand at the plurality of access points of the wireless network for the venue;
determining, for a particular time for the event at the venue, a distribution of wireless devices and channel support capabilities of the wireless devices at one or more locations of the plurality of locations for the venue; and
providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue.

2. The method of claim 1, wherein the profile for the event identifies one or more of:
a type of the event;
location information for the venue identifying at least one of entrance locations for the venue, exit locations for the venue, bathroom locations for the venue, food locations for the venue, walkways for the venue, and seating information for the event;
at least one of expected wireless device types or expected wireless device capabilities for the event; or
temporal information for the event.

3. The method of claim 2, wherein temporal information for the event includes one or more of:
a start time for the event;
an end time for the event; or
one or more intermediate times for the event.

4. The method of claim 2, wherein the initial configuration is further based on at least one of the expected wireless device types or the expected wireless device capabilities for the event.

5. The method of claim 1, wherein providing the initial configuration for the plurality of access points of the wireless network for the event at the venue includes configuring at least one of channels or control features that are to be provided by the plurality of access points of the wireless network for the plurality of locations for the venue.

6. The method of claim 1, wherein the distribution of the wireless devices and the channel support capabilities of the wireless devices at the one or more locations of the plurality of locations for the venue are determined based on at least one of probe requests or association requests for the wireless devices.

7. The method of claim 6, wherein the probe requests or the association requests identify, at least in part, channels and control features supported by the wireless devices at the one or more locations of the plurality of locations for the venue.

8. The method of claim 7, wherein the channels and the control features supported by the wireless devices at the one or more locations of the plurality of locations for the venue are determined based on vendor information for the wireless devices included in the probe requests for the wireless devices.

9. The method of claim 7, wherein the control features include one or more of:
   Target Wake Time (TWT);
   restricted TWT (rTWT);
   Multi-Link Operation (MLO);
   spectrum or bandwidth specific features; or
   Dynamic Frequency Selection (DFS).

10. The method of claim 7, wherein providing the updated configuration for the one or more access points of the plurality of access points of the wireless network for the venue at the one or more locations for the venue includes configuring at least one of channels or control features that are to be provided at the one or more access points of the plurality of access points based on the distribution of the wireless devices and the channel support capabilities of the wireless devices determined for the particular time for the event at the venue.

11. One or more non-transitory computer readable storage media encoded with instructions that, when executed by a processor, cause the processor to perform operations, comprising:
   providing an initial configuration for a plurality of access points of a wireless network for an event at a venue, wherein the initial configuration is based on a profile for the event, a location of each access point of the plurality of access points of the wireless network for a plurality of locations for the venue, and anticipated demand at the plurality of access points of the wireless network for the venue;
   determining, for a particular time for the event at the venue, a distribution of wireless devices and channel support capabilities of the wireless devices at one or more locations of the plurality of locations for the venue; and
   providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue.

12. The media of claim 11, wherein the profile for the event identifies one or more of:
   a type of the event;
   location information for the venue identifying at least one of entrance locations for the venue, exit locations for the venue, bathroom locations for the venue, food locations for the venue, walkways for the venue, and seating information for the event;
   at least one of expected wireless device types or expected wireless device capabilities for the event; or
   temporal information for the event that includes one or more of: a start time for the event, an end time for the event, or one or more intermediate times for the event.

13. The media of claim 12, wherein the initial configuration is further based on at least one of the expected wireless device types or the expected wireless device capabilities for the event.

14. The media of claim 11, wherein providing the initial configuration for the plurality of access points of the wireless network for the event at the venue includes configuring at least one of channels or control features that are to be provided by the plurality of access points of the wireless network for the plurality of locations for the venue.

15. The media of claim 11, wherein the distribution of the wireless devices and the channel support capabilities of the wireless devices at the one or more locations of the plurality of locations for the venue are determined based on at least one of probe requests or association requests for the wireless devices.

16. A wireless local area network (LAN) controller (WLC) comprising:
   at least one memory element for storing data; and
   at least one processor for executing instructions associated with the data, wherein executing the instructions causes the WLC to perform operations, comprising:
      providing an initial configuration for a plurality of access points of a wireless network for an event at a venue, wherein the initial configuration is based on a profile for the event, a location of each access point of the plurality of access points of the wireless network for a plurality of locations for the venue, and anticipated demand at the plurality of access points of the wireless network for the venue;
      determining, for a particular time for the event at the venue, a distribution of wireless devices and channel support capabilities of the wireless devices at one or more locations of the plurality of locations for the venue; and
      providing an updated configuration for one or more access points of the plurality of access points of the wireless network for the venue at the one or more locations of the plurality of locations for the venue based on the distribution of the wireless devices and the channel support capabilities of the wireless devices determined for the particular time for the event at the venue.

17. The WLC of claim 16, wherein the profile for the event identifies one or more of:
   a type of the event;
   location information for the venue identifying at least one of entrance locations for the venue, exit locations for the venue, bathroom locations for the venue, food locations for the venue, walkways for the venue, and seating information for the event;
   at least one of expected wireless device types or expected wireless device capabilities for the event; or
   temporal information for the event that includes one or more of: a start time for the event, an end time for the event, or one or more intermediate times for the event.

18. The WLC of claim 17, wherein the initial configuration is further based on at least one of the expected wireless device types or the expected wireless device capabilities for the event.

19. The WLC of claim 16, wherein providing the initial configuration for the plurality of access points of the wireless network for the event at the venue includes configuring at least one of channels or control features that are to be provided by the plurality of access points of the wireless network for the plurality of locations for the venue.

20. The WLC of claim 16, wherein the distribution of the wireless devices and the channel support capabilities of the wireless devices at the one or more locations of the plurality of locations for the venue are determined based on at least one of probe requests or association requests for the wireless devices.

* * * * *